(12) United States Patent
Nemeth et al.

(10) Patent No.: US 7,889,284 B1
(45) Date of Patent: Feb. 15, 2011

(54) RIGID ANTIGLARE LOW REFLECTION GLASS FOR TOUCH SCREEN APPLICATION

(75) Inventors: Paul R. Nemeth, Cedar Rapids, IA (US); Tracy J. Barnidge, Marion, IA (US); Sandra S. Dudley, Walker, IA (US); Gary N. Prior, Center Point, IA (US); James D. Sampica, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 196 days.

(21) Appl. No.: 12/012,722

(22) Filed: Feb. 5, 2008

(51) Int. Cl.
*G02F 1/133* (2006.01)
(52) U.S. Cl. .......................... 349/12; 345/173
(58) Field of Classification Search ........................ None
See application file for complete search history.

(56) References Cited

U.S. PATENT DOCUMENTS

| 4,634,683 | A | * | 1/1987 | Dumbaugh | 501/32 |
|---|---|---|---|---|---|
| 6,572,941 | B1 | * | 6/2003 | Murakami et al. | 428/34 |
| 2002/0033919 | A1 | * | 3/2002 | Sanelle et al. | 349/122 |
| 2002/0101409 | A1 | * | 8/2002 | Yokoyama et al. | 345/173 |
| 2002/0159003 | A1 | * | 10/2002 | Sato et al. | 349/65 |
| 2005/0073507 | A1 | * | 4/2005 | Richter et al. | 345/174 |
| 2006/0017706 | A1 | * | 1/2006 | Cutherell et al. | 345/173 |
| 2008/0286548 | A1 | * | 11/2008 | Ellison et al. | 428/220 |
| 2009/0197048 | A1 | * | 8/2009 | Amin et al. | 428/142 |
| 2009/0324939 | A1 | * | 12/2009 | Feinstein et al. | 428/337 |

FOREIGN PATENT DOCUMENTS

JP  5-324203 A  * 12/1993
JP  11-53114 A  *  2/1999

* cited by examiner

*Primary Examiner*—Mike Stahl
(74) *Attorney, Agent, or Firm*—Matthew J. Evans; Daniel M. Barbieri

(57) ABSTRACT

A display screen device may comprise a first substrate including at least a substantially transparent glass having a thickness less than or equal to 1.1 millimeters; an anti-reflective thin film coating; and a second substrate including a touch screen device. Additionally, a method for providing a display screen device is disclosed.

10 Claims, 8 Drawing Sheets

400

410
texturing a first substrate including at least a substantially transparent glass having a thickness less than or equal to 1.1 millimeters

510
etching the first substrate in a sodium hydroxide solution

420
coating the first substrate with an anti-reflective thin film coating

430
adhering the first substrate with an anti-reflective thin film coating to a second substrate with an adhesive, the second substrate including a touch screen device

FIG. 5

RIGID ANTIGLARE LOW REFLECTION GLASS FOR TOUCH SCREEN APPLICATION

TECHNICAL FIELD

The present invention generally relates to the field of display device formation, and more particularly to a flat panel display unit display device.

BACKGROUND

A liquid crystal display ("LCD") and/or a flat panel display unit may be a thin, flat display device including a number of color and/or monochrome pixels arrayed in front of a light source. Each pixel may include a layer of liquid crystal molecules aligned between two transparent electrodes and/or two polarizing filters. LCD screens generally operate by passing an electric current through the liquid crystal layer, which causes the crystals to align in a specific orientation so that light can or cannot pass through them. Each crystal may function as a shutter and either allow light to pass through or be blocked. LCD devices and/or flat panel display units have become a primary means for displaying information.

SUMMARY

The present disclosure is directed to a display screen protective assembly and method for providing the display screen protective assembly.

A display screen device may comprise a first substrate including at least a substantially transparent glass having a thickness less than or equal to 1.1 millimeters; an anti-reflective thin film coating; and/or a second substrate including a touch screen device.

A flat panel display unit may comprise a first substrate including at least a substantially transparent glass having a thickness less than or equal to 1.1 millimeters; an anti-reflective thin film coating; a second substrate including a touch screen device; a flat panel display including at least one of a third substrate, a fourth substrate, a liquid crystal layer embedded between the third and fourth substrate, or a backlight assembly; and/or at least one printed circuit board.

A method for providing a rigid antiglare low reflection glass for touch screen applications may comprise texturing a first substrate including at least a substantially transparent glass having a thickness less than or equal to 1.1 millimeters; coating the first substrate with an anti-reflective thin film coating; and adhering the first substrate with an anti-reflective thin film coating to a second substrate with an adhesive, the second substrate including a touch screen.

It is to be understood that both the foregoing general description and the following detailed description are exemplary and explanatory only and are not restrictive of the invention claimed. The accompanying drawings, which are incorporated in and constitute a part of the specification, illustrate an example of the invention and together with the general description, serve to explain the principles of the technology.

BRIEF DESCRIPTION OF THE DRAWINGS

The numerous objects and advantages of the present technology may be better understood by those skilled in the art by reference to the accompanying figures in which:

FIG. 5 is a process flowchart illustrating variants of the process in FIG. 4;

DETAILED DESCRIPTION

Figure 1:
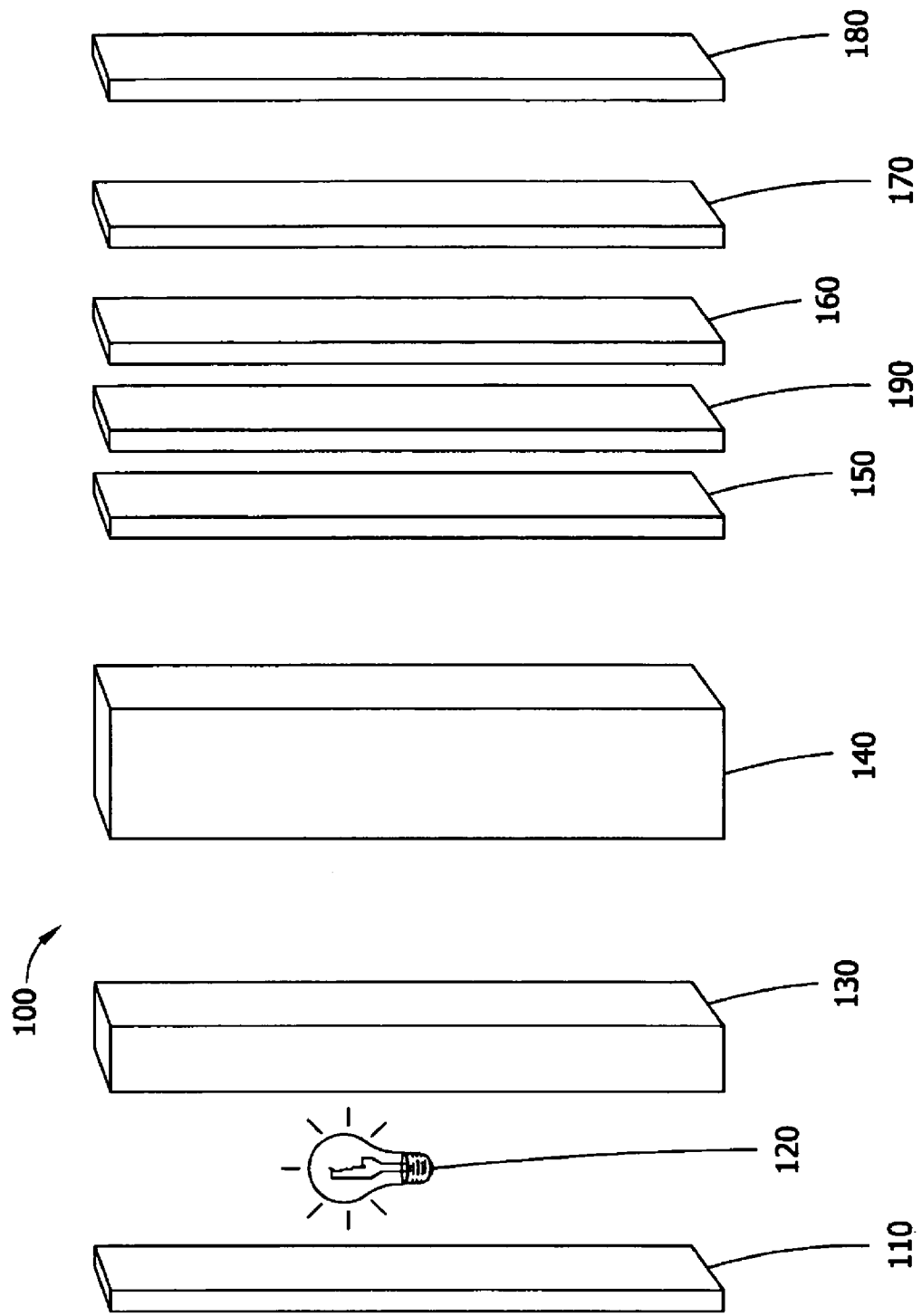
FIG. 1 is an exploded view of a flat panel display unit.

The following discussion is presented to enable a person skilled in the art to make and use the present teachings. Various modifications to the illustrated examples will be readily apparent to those skilled in the art, and the generic principles herein may be applied to other examples and applications without departing from the present teachings. Thus, the present teachings are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of the present teachings. Skilled artisans will recognize the examples provided herein have many useful alternatives and fall within the scope of the present teachings.

Reference will now be made, in detail, to presently preferred embodiments of the invention. Additional details of the invention are provided in the examples illustrated in the accompanying drawings.

Figure 2:
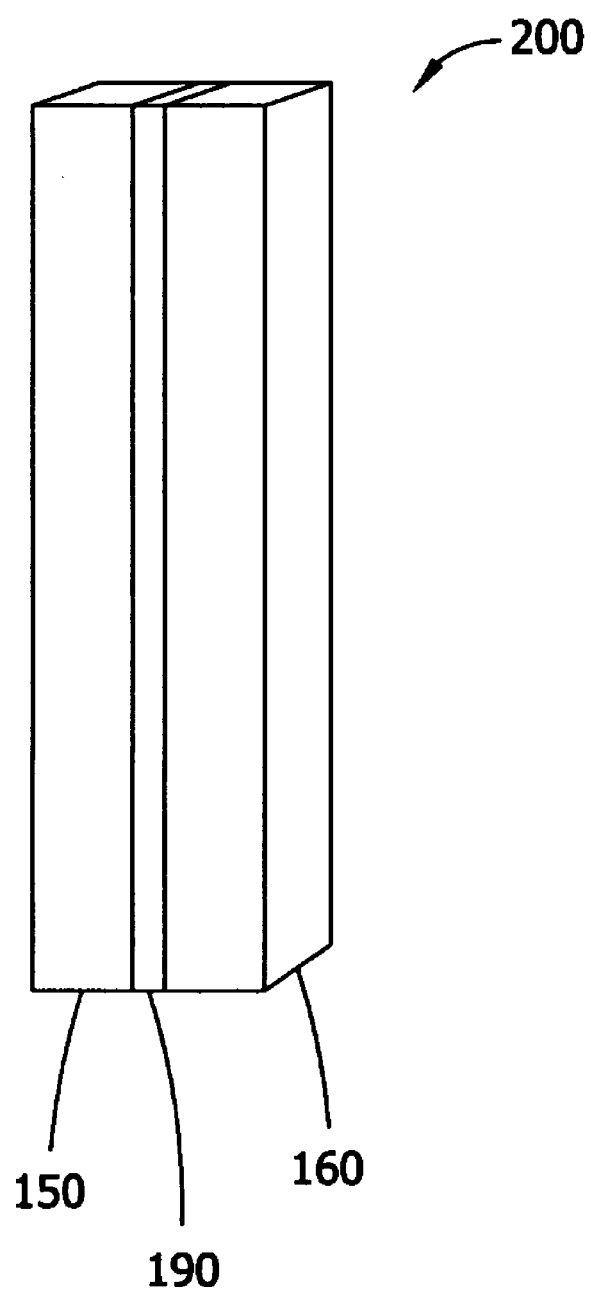
FIG. 2 is an isometric view of a display screen protective assembly.
Figure 3:
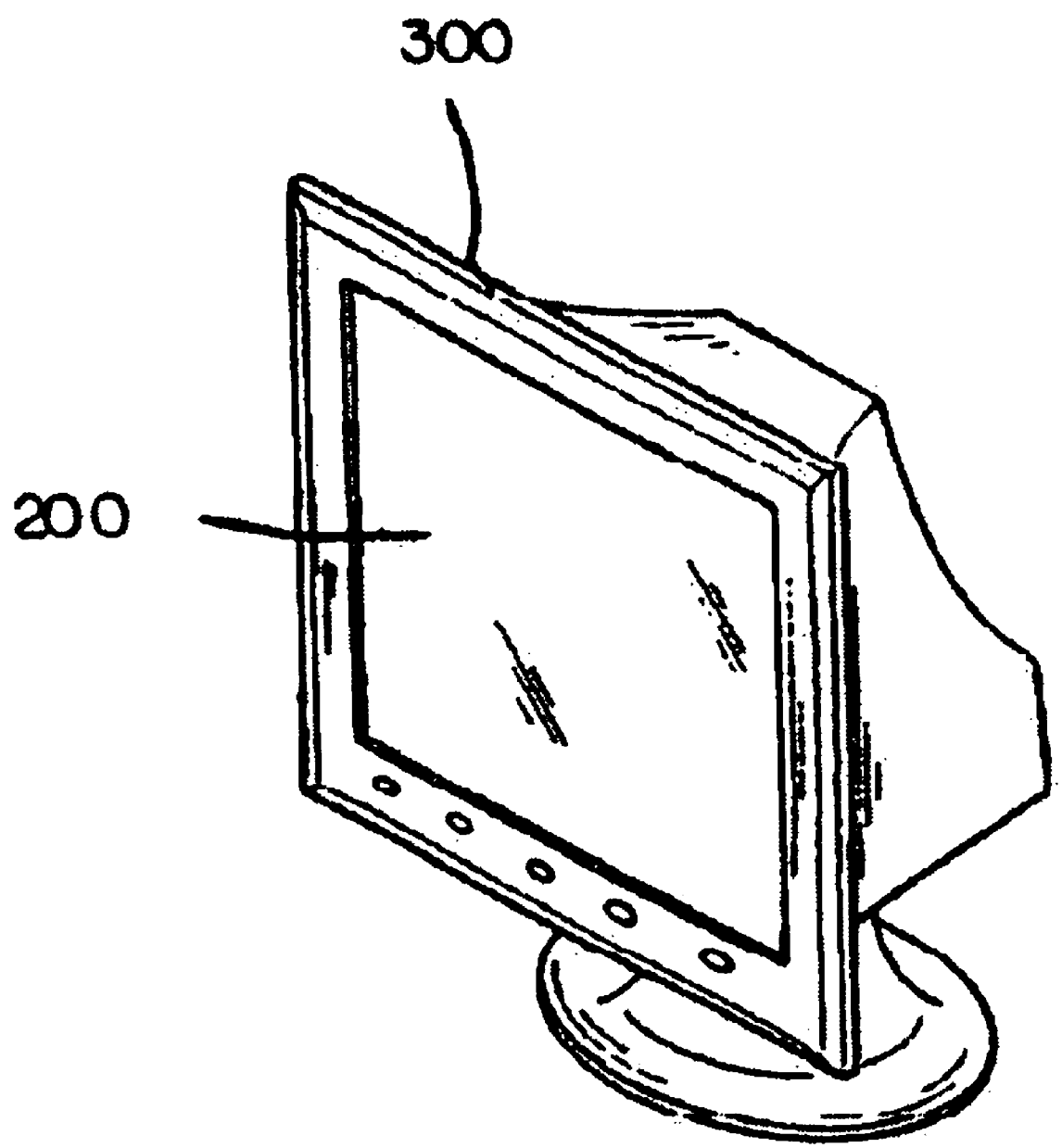
FIG. 3 is an isometric view of a display screen device.

Referring generally to FIGS. 1 through 3, a display screen device 300 utilizing an anti-glare substrate 160 and method for providing a display screen device 300 utilizing an anti-glare substrate 160 are disclosed. In general, the display screen device 300 may include a first substrate including an anti-glare substrate 160, an anti-reflective thin film coating, and a second substrate including a touchscreen device 150.

A display screen device 300 may include an anti-glare substrate 160. A substrate may refer to any rigid or semi-rigid planar surface of glass, plastic, film, and/or metal. Additionally, a substrate may refer to any rigid or semi-rigid planar surface of glass, plastic, film, and/or metal coated with an adhesive. In some instances, an anti-glare substrate 160 may include sodium silicate, borosilicate, alumino-silicate, and/or any other glass type including chemically strengthened glass. In one instance, an anti-glare substrate 160 may include an alumino-silicate glass 0.5 millimeters thick. The anti-glare substrate 160 may have a thickness less than and/or equal to 1.1 millimeters. An alumino-silicate glass may include a glass having aluminum oxide as a component. Alumino-silicate glass may be advantageous due to its thermal-shock-resisting characteristic and the ability to withstand relatively high operating temperatures. Additionally, alumino-silicate glass may be environmentally durable.

The anti-glare substrate 160 may be textured. For example, texturing may include an etching process. Etching may include wet and/or dry processes. In one specific instance utilizing a wet etch process, etching may include dipping at least a portion of an alumino-silicate glass substrate into a container with an etchant. A wet etchant may include any suitable wet etchant, such as acids, caustic solutions, alcohols, water, and/or mixtures thereof. A dry etchant may include any suitable dry etchant, such as gases, mixtures of gases, and/or a plasma. In one specific example of utilizing a dry etch process, a substrate is placed into a container and a gas etches the substrate. Etching may be advantageous because it may reduce the thickness of a substrate and/or may create a textured surface on the substrate useful for reducing the amount of specular light the surface of the substrate reflects. Other anti-glare substrate 160 texturing techniques may include embossing, molding, etc.

An anti-glare substrate 160 utilized on a display screen device 300 may include additional coatings and/or thin films. One additional coating may include an anti-reflective film 170, such as an anti-reflective ("AR") coating. One typical AR coating may be characterized by a low reflectance computed by integrating the contribution of each wavelength over the visible spectrum of light. Another AR coating may include a low index material, such as $MgF_2$, which may be deposited as a thin film on a substrate using traditional physical vapor deposition and/or other vacuum deposition methods. In some instances, an AR coating may include transparent thin film structures with alternating layers of contrasting refractive index, also referred to as a coating stack. Differing layer indices may be chosen for producing at least one destructive interference to reflected light. Thin film layers may be achieved through deposition on a substrate. Types of deposition may include physical vapor deposition, such as evaporative and/or sputter deposition, and/or chemical vapor deposition. One example of a suitable AR coating may include a multi-layer stack of individual AR coatings. Examples of suitable AR coatings and/or layers of an AR coating may include $TiO_2$, $SiO_2$, ZnO, $SnOxZrO_2$, $Ta_2O_5$, $NiCrO_x$, $Sb_2O_3$, $In_2O_3$, ZrN, TiN, $Al_2O_3$, AlSi oxide, NiSi oxide, MgO, $MgF_2$, and/or other suitable coatings. In one specific example, a five layer AR coating stack includes a first substrate layer, a first AR layer including $TiO_2$, a second AR layer including $SiO_2$, a third AR layer including ZnO, a fourth AR layer including $TiO_2$, and a fifth AR layer including $SiO_2$. The AR layers may include layers of different thicknesses and different compositions.

Generally, an AR coating may be applied to an anti-glare substrate 160 utilizing adhesion and/or lamination. An adhesive may include a liquid, dry, and/or semi-liquid adhesive. In one example, an AR coating may be laminated without an adhesive utilizing a vacuum lamination method. In another example, an AR coating may utilize an adhesive layer 190 including an optical film adhesive. An optical film adhesive may include any adhesive suitable for adhering to an optical film and/or other substrate. The adhesive layer 190 may be applied to the anti-glare substrate 160, the touchscreen device 150, and/or both. The adhesive layer 190 may include a pressure sensitive adhesive ("PSA") layer, a temperature sensitive adhesive layer, and/or an adhesive curable by ultraviolet radiation, heat, and/or other curing methods. A PSA layer may include at least one tacky elastomer, such as block copolymers of styrene/isoprene, acrylate copolymers, styrene and/or butadiene rubber, butyl rubber, polymers of isobutylene and silicones, and/or other polymers and natural rubber. Additionally, a dry film adhesive may be utilized as the adhesive layer 190. A dry film adhesive may cover the whole surface of one or more substrates being laminated. A dry film adhesive may be adhered to a substrate using a roller or other suitable techniques. Potential gas bubbles in the adhesive layer resulting from the lamination process may be minimized by utilizing a vacuum during lamination. Additional examples of dry film lamination processes may be found in U.S. Patent Application Express Mailing Label EM117518596 entitled SUBSTRATE LAMINATION SYSTEM AND METHOD, naming Tracy J. Barnidge, Paul R. Nemeth, James D. Sampica, and Vincent P. Marzen as inventors, filed Jan. 18, 2008; U.S. Patent Application Express Mailing Label EM117518605 entitled SUBSTRATE LAMINATION SYSTEM AND METHOD, naming James D. Sampica, Paul R. Nemeth, Tracy J. Barnidge, and Vincent P. Marzen as inventors, filed Jan. 18, 2008; U.S. Patent Application Express Mailing Label EM117518640 entitled SYSTEM AND METHOD FOR COMPLETING LAMINATION OF RIGID-TO-RIGID SUBSTRATES BY THE CONTROLLED APPLICATION OF PRESSURE, naming James D. Sampica, Paul R. Nemeth, Tracy J. Barnidge, and Vincent P. Marzen as inventors, filed Jan. 18, 2008; and U.S. Patent Application Express Mailing Label EM117518667 entitled ALIGNMENT SYSTEM AND METHOD THEREOF, naming James D. Sampica, Paul R. Nemeth, Tracy J. Barnidge, and Vincent P. Marzen as inventors, filed Jan. 18, 2008, all incorporated herein by reference.

Other coatings may be applied and/or adhered to the anti-glare substrate 160. One optional coating 180 may include anti-reflective film 170. An anti-reflective film 170 may be applied on the anti-glare substrate 160 as a coating and/or integrated in the anti-glare substrate 160. One example of an integrated anti-reflective film 170 may include a first layer including an anti-glare substrate, a second layer including an anti-reflective film, and a third layer including an anti-glare substrate. Another optional coating may include an electromagnetic interference ("EMI") shield. An EMI shield may be advantageous because it may function to shield electromagnetic interference. One example of an EMI shield may include an indium tin oxide coating. An EMI shield may also utilize other materials suitable for reducing electromagnetic interference. Some EMI shields may be deposited on a substrate and/or other coating layer utilizing a process such as Ion Assist Deposition (IAD). IAD permits the indium tin oxide based coating to be compacted resulting in a ruggedized coating capable of withstanding other process steps, such as the addition of an optional AR coating. In one example, an indium tin oxide coating is deposited followed by an AR coating. An additional example of an EMI shield may include an EMI mesh.

A further coating may include an optional coating 180, such as a hydrophobic coating. A hydrophobic coating and/or solution may fill microscopic surface features. Spaces between these crystals and/or particles may be penetrated by dirt, grease and/or other contaminants during normal use of the substrate. A hydrophobic coating may fill the spaces between the crystals and/or particles in another coating layer and create a smooth surface without changing the properties of the other coating layer. The smooth surface may prevent dirt, grease and/or other contaminants from filling the spaces resulting in a display screen protective assembly 200 with less smudges and easier cleaning properties. One advantage of a hydrophobic coating may include anti-smudge properties. An example of a hydrophobic coating may include a fluorocarbon based hydrophobic coating. Another example of a hydrophobic coating may include a polysiloxane-based coating. A hydrophobic coating may include any other polymeric coating. In one instance, a display screen device 300 includes an anti-reflective film coating adhered to an anti-glare substrate 160 and an EMI shield adhered to the anti-reflective film coating. Optional coatings may be applied to a display screen protective assembly 200 utilizing different arrangements, thicknesses, and multiple layers. Other optional coatings may include an oleophobic coating, a hydrophilic coating, and/or a dust resistant coating. An oleophobic coating may include a coating having a lack of affinity for oils and/or other nonpolar substances. A dust resistant coating may include a coating resistant to dust and other similar objects due to anti-static properties and/or other means. Multiple optional coatings may be utilized simultaneously on a substrate. In one example, a first coating includes an EMI shield and a second coating includes an oleophobic coating.

The display screen device 300 may include a touchscreen device 150. The touchscreen device 150 may be utilized as an input device and may include a display having the ability to detect the location of a touch within a display area. The touchscreen device 150 may include technology including resistive touch, surface acoustic wave, capacitive, infrared, a strain gauge configuration, optical imaging, dispersive signal technology, acoustic pulse recognition, frustrated total internal reflection, graphics tablet/screen hybrid techniques, and/or other technology. In one example, a display screen protective assembly 200 may include an anti-glare substrate 160, an anti-reflective film 170, and a touchscreen device 150 including resistive touch technology. Additionally, a display screen device 300 may include a liquid crystal display (LCD), an organic light-emitting diode (OLED), a plasma display, other flat panel displays, and/or other emissive display technology.

The display screen device 300 may include a flat panel display 140. A flat panel display 140 may include at least one substrate, a liquid crystal layer, at least one polarizing filter, at least one electrode, and/or at least one color filter layer. The liquid crystal layer may be disposed between two substrates. The liquid crystal layer may include liquid crystals which may be long chain-like molecules having the property of being able to rotate from a first axis orientation to a second axis orientation when a voltage is applied to a cell gap. The amount of applied voltage and a corresponding degree of rotation of the liquid crystal may determine the amount of light passing through the liquid crystal layer and the amount of light visible to a user. A color filter layer may be placed over discrete cell locations in a pixel and/or mosaic pattern and may be configured to emit a certain color.

The display screen device 300 may include a backlight assembly and may include a reflective film 110, a light source 120, and/or a light guide 130. A reflective film 110 may include any reflective material for redirecting light from light source 120 through light guide 130 and flat panel display 140 to a user. The reflective film 110 may include films and/or other compositions utilized for reflecting light. The light source 120 may include a high intensity light generating device. Any light having sufficient brightness and emissive spectra may be utilized. For example, a light source 120 may include a conventional fluorescent light assembly, a conventional incandescent light assembly, a halogen light assembly, a light-emitting diode, an electroluminescent panel, a cold cathode fluorescent lamp, a hot cathode fluorescent lamp, and/or any other suitable light generating device. The light guide 130 may direct light generated by the light source 120 and/or reflected by reflective film 110 through the flat panel display 140 and/or the display screen protective assembly 200.

Figure 4:
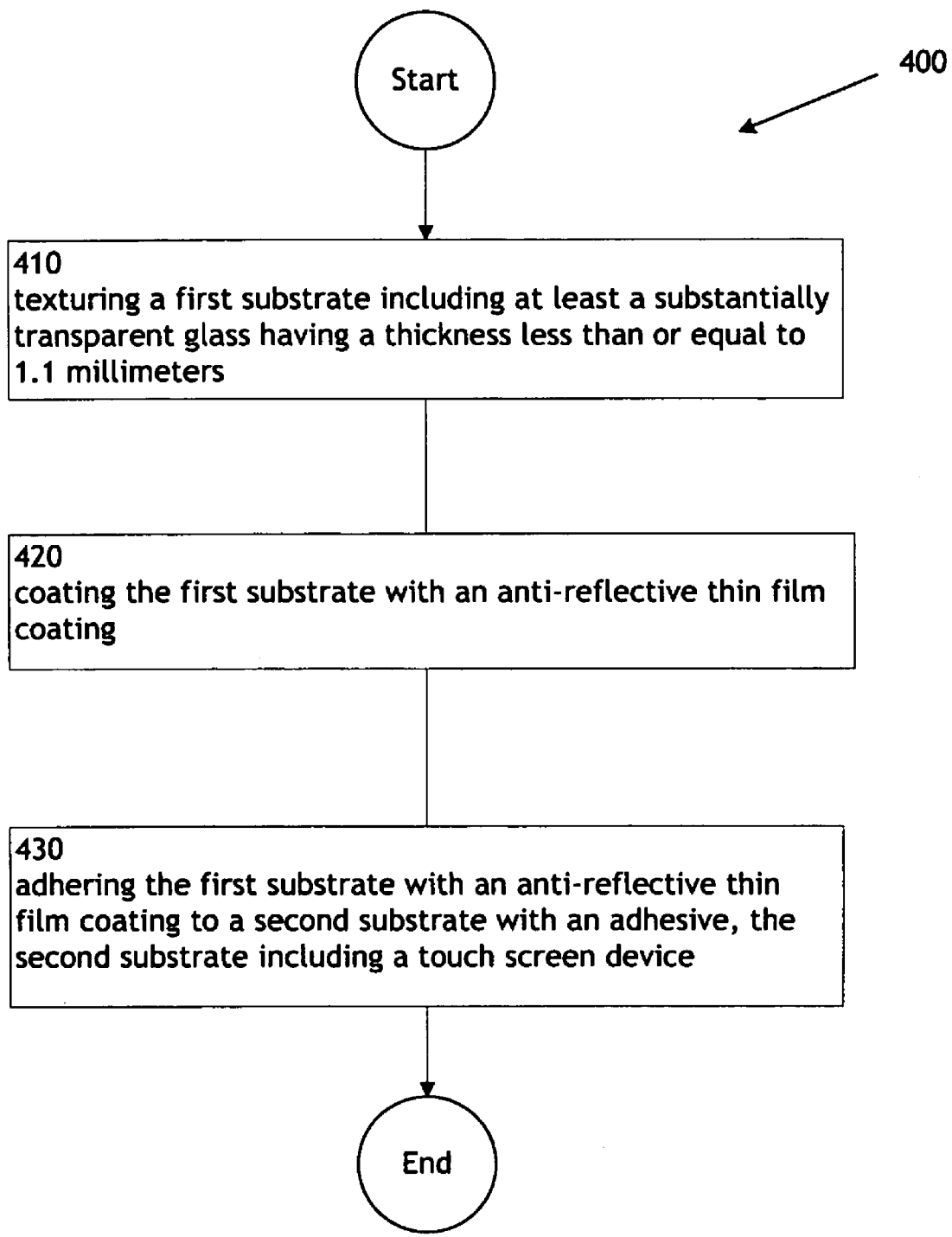
FIG. 4 is a process flowchart for providing a rigid antiglare low reflection glass for a touch screen application.

Referring generally to FIGS. 4 through 8, methods for providing a rigid antiglare low reflection glass for a touchscreen application are disclosed. FIG. 4 illustrates an operational flow 400 representing example operations related to providing a rigid antiglare low reflection glass for a touch screen application. In FIG. 4 and in following figures that include various examples of operational flows, discussion and explanation may be provided with respect to the above-described examples of FIGS. 1 through 8, and/or with respect to other examples and contexts. However, it should be understood that the operational flows may be executed in a number of other environments and contexts, and/or in modified versions of FIGS. 1 through 8. Also, although the various operational flows are presented in the sequence(s) illustrated, it should be understood that the various operations may be performed in other orders than those which are illustrated, or may be performed concurrently.

After a start operation, the operational flow 400 moves to a texturing operation 410, where texturing a first substrate including at least a substantially transparent glass having a thickness less than or equal to 1.1 millimeters may occur. For example, as shown in FIGS. 1 and 2, the first substrate may include an antiglare substrate 160 being a glass with a thickness of 0.55 millimeters. Texturing operation 410 may be conducted in an automated fashion such as, for example, by an automated texturing module 810 (e.g. a robotic arm and etchant batch tanks configured to texture the antiglare substrate 160 of FIGS. 1 and 2), such as those commonly found in the manufacturing arts, may be employed.

Then, in a coating operation 420, coating the first substrate with an anti-reflective thin film coating may occur. For example, as shown in FIGS. 1 and 2, the antiglare substrate 160 may be coated with anti-reflective film 170. Coating operation 820 may be conducted in an automated fashion such as, for example, by an automated coating module 820 (e.g. a robotic arm and/or automated production line configured to coat the antiglare substrate 160 of FIGS. 1 and 2 with anti-reflective film 170 of FIG. 1) such as those commonly found in the manufacturing arts may be employed.

Then, in an adhering operation 430, adhering the first substrate with an anti-reflective thin film coating to a second substrate with an adhesive, the second substrate including a touch screen may occur. For example the adhering module 830 may cause the antiglare substrate 160 with anti-reflective film 170 to be laminated to a touchscreen device 150. Laminating or adhering may include, for example, bonding at least two layers together by utilizing an adhesive (liquid and/or dry film), tape, or other fastening composition, including those previously discussed. Adhering operation 430 may be conducted in an automated fashion such as, for example, by an automated adhering module 830 (e.g. a robot arm and/or automated production line configured to adhere the antiglare substrate 160 with anti-reflective film 170 to a touchscreen device 150) such as those commonly found in the manufacturing arts may be employed.

FIG. 5 illustrates alternative embodiments of the example operational flow 400 of FIG. 4. FIG. 5 illustrates example embodiments where the texturing operation 410 may include at least one additional operation. Additional operations may include an operation 510.

At the operation 510, etching the first substrate in a sodium hydroxide solution may occur. For example, the etching module 840 may etch the first substrate in a sodium hydroxide solution. Etching may include corroding, texturing, and/or removing a layer of a substrate. Etching may include dry etching and/or wet etching. In one instance, etching module 840 may include a robot arm and/or etchant batch tanks having a sodium hydroxide solution configured to texture the antiglare substrate 160.

Figure 6:
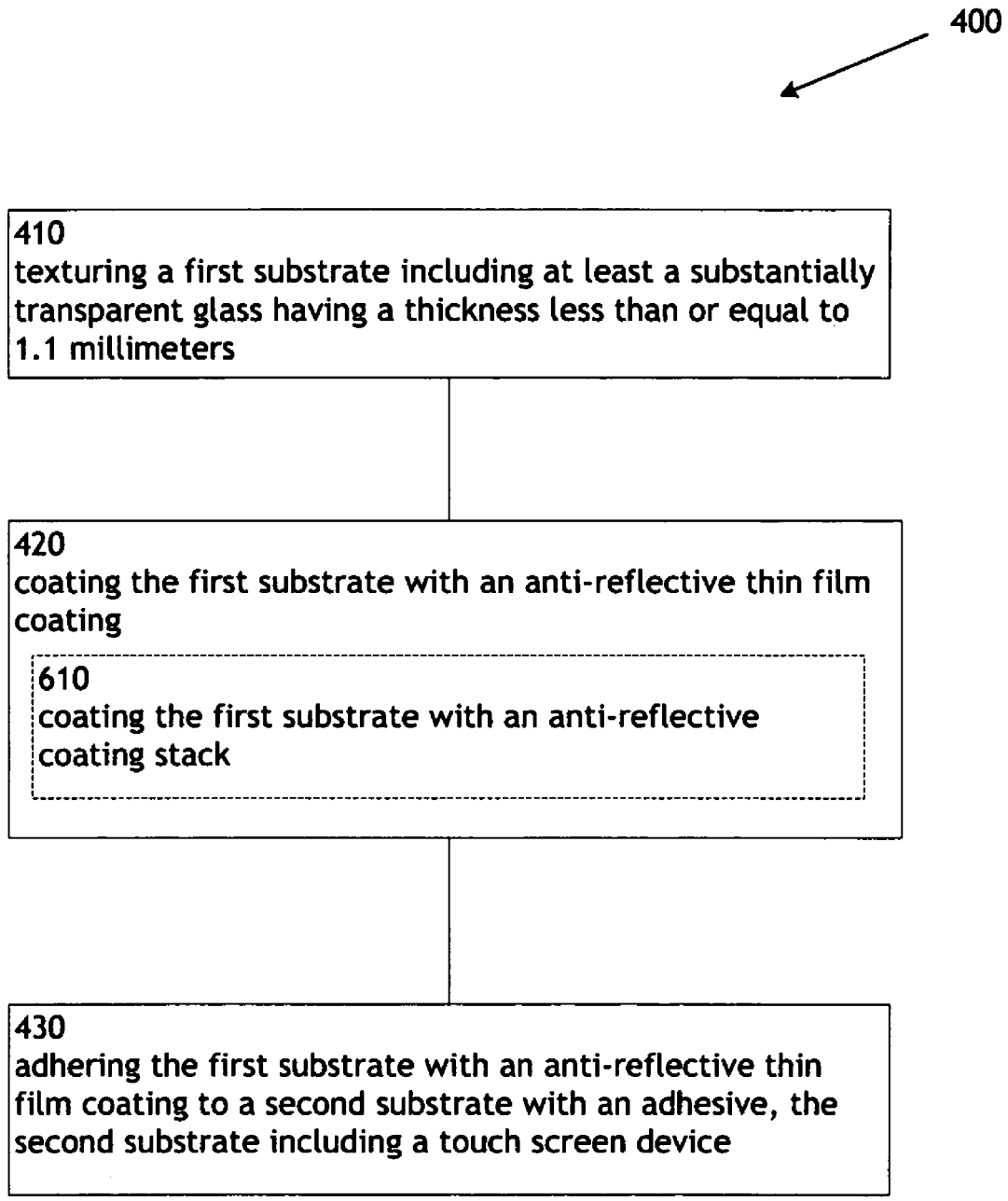
FIG. 6 is a process flowchart illustrating variants of the process in FIG. 4.

FIG. 6 illustrates alternative embodiments of the example operational flow 400 of FIG. 4. FIG. 6 illustrates example embodiments where the coating operation 420 may include at least one additional operation. Additional operations may include an operation 610.

At the operation 610, coating the first substrate with an anti-reflective coating stack may occur. For example, the coating module 820 may coat the first substrate with an anti-reflective coating stack. A coating stack may include a stack of coating layers and may include layers having very low and very high refractive indices. In one instance, coating module 820 may include a robot arm and/or automated production line configured to coat the antiglare substrate 160 of FIGS. 1 and 2 with anti-reflective film 170 of FIG. 1.

Figure 7:
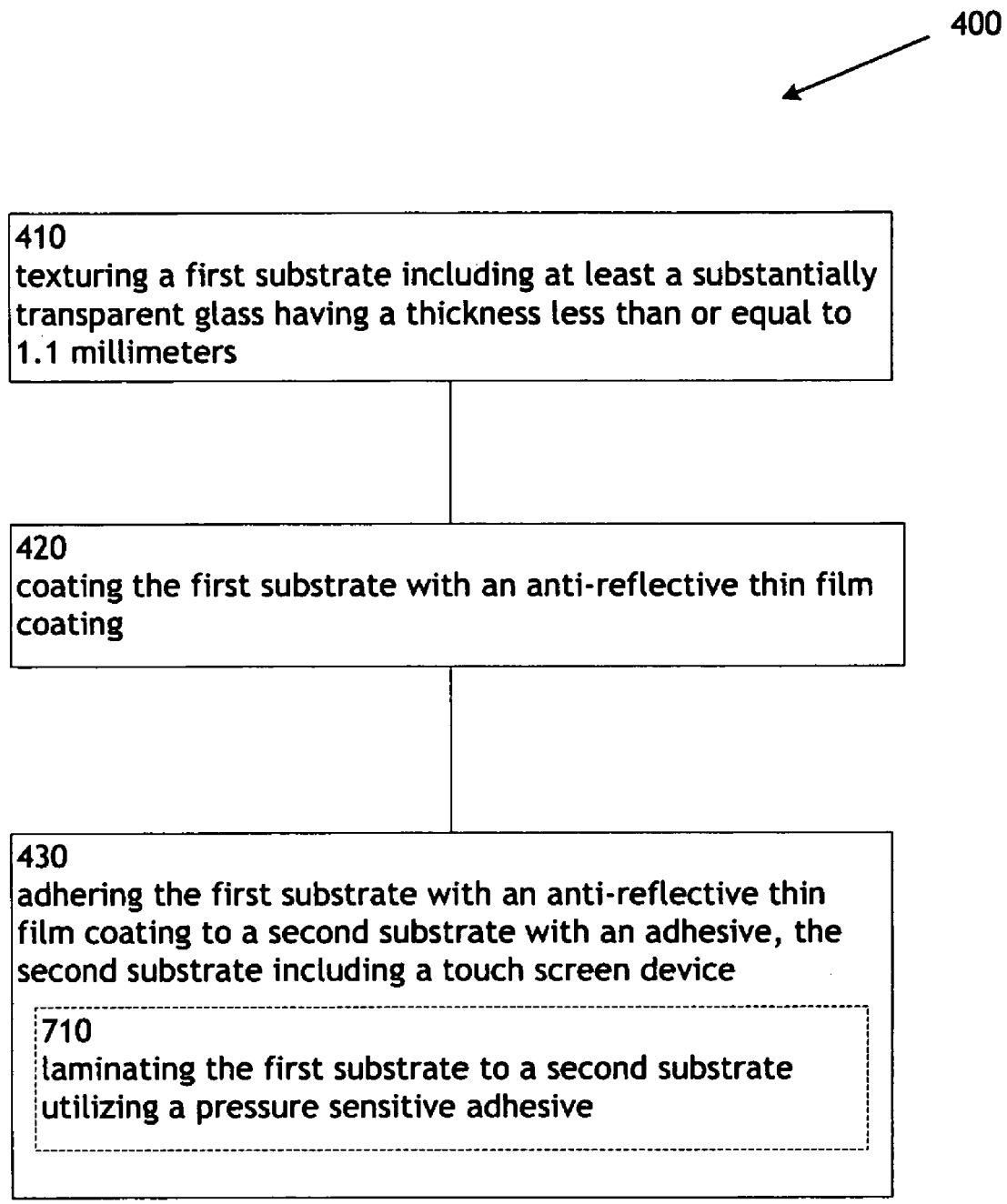
FIG. 7 is a process flowchart illustrating variants of the process in FIG. 4.
Figure 8:
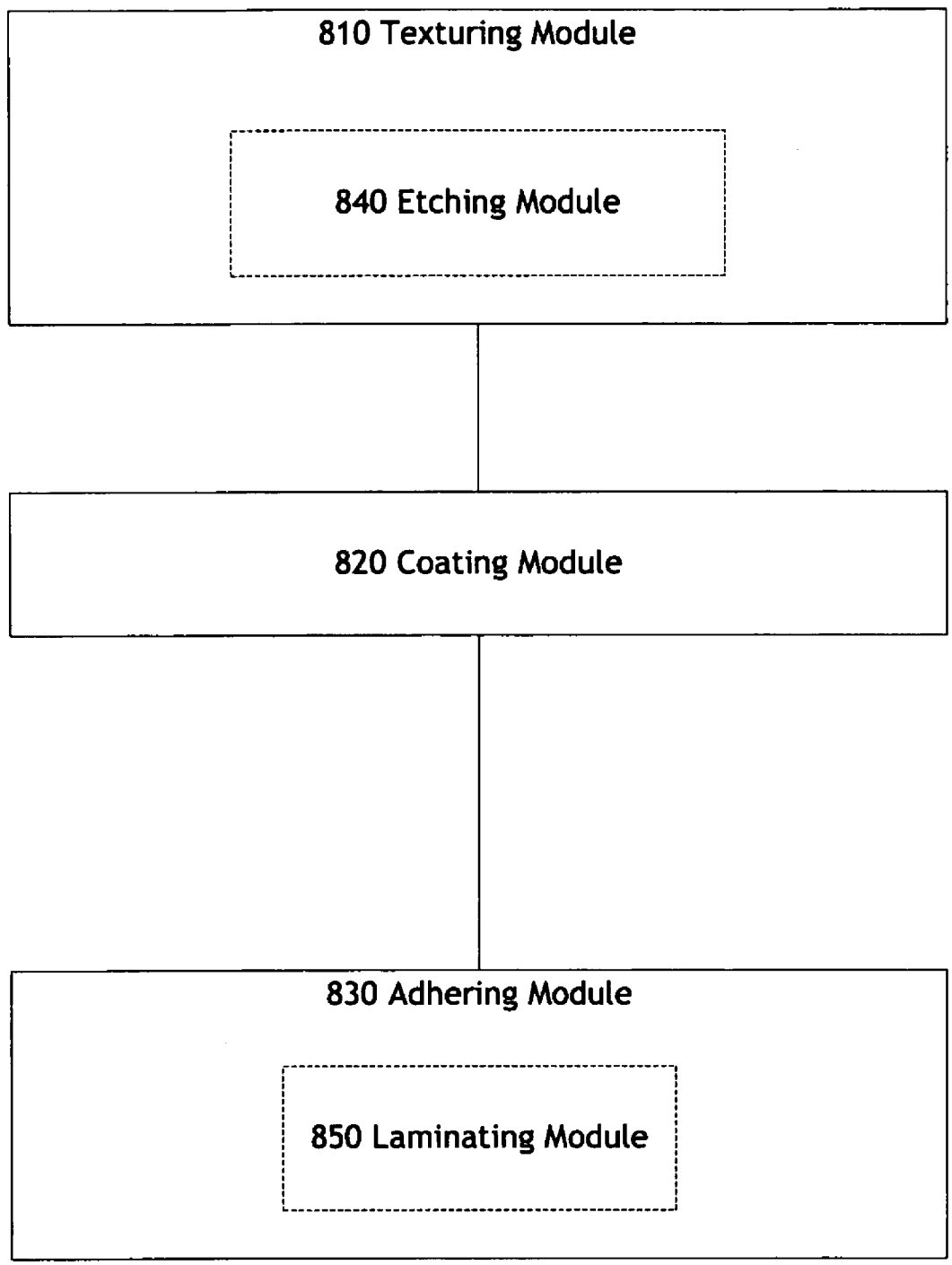
FIG. 8 depicts an exemplary environment in which one or more technologies may be implemented.

FIG. 7 illustrates alternative embodiments of the example operational flow 400 of FIG. 4. FIG. 7 illustrates example embodiments where the adhering operation 420 may include at least one additional operation. Additional operations may include an operation 710.

At the operation 710, laminating the first substrate to a second substrate utilizing a pressure sensitive adhesive may occur. For example, the laminating module 850 may laminate the first substrate to a second substrate by utilizing a pressure sensitive adhesive. In one instance, laminating module 850 may include a robot arm and/or automated production line configured to adhere the antiglare substrate 160 of FIGS. 1 and 2 with anti-reflective film 170 of FIG. 1 to a touchscreen device 150 of FIGS. 1 and 2 by utilizing an optically clear pressure sensitive adhesive.

It is believed that the present technology and many of its attendant advantages will be understood from the foregoing description, and it will be apparent that various changes may be made in the form, construction, and arrangement of the components thereof without sacrificing all of its material advantages. The form herein before described being merely explanatory embodiments thereof, it is the intention of the following claims to encompass and include such changes.

What is claimed is:

1. A display screen device, comprising:
   a first substrate including at least a substantially transparent textured, etched alumino-silicate glass having a thickness of about 0.5 millimeters, said textured, etched alumino-silicate glass reduces an amount of reflected specular light on a surface of the first substrate;
   an anti-reflective thin film coating applied to the first substrate;
   a second substrate including a touch screen device, the second substrate being laminated to the first substrate, the touch screen device of the second substrate detects a location of a touch in a display area of said second substrate; and
   an exterior oleophobic coating.

2. The display screen device of claim 1, wherein said anti-reflective thin film coating comprises:
   an anti-reflective coating stack.

3. The display screen device of claim 1, wherein said second substrate including a touch screen device comprises:
   an outer screen of a flat panel display touchscreen.

4. The display screen device of claim 1, further comprising:
   a hydrophobic coating.

5. The display screen device of claim 1, further comprising:
   a conductive coating for reducing electro-magnetic interference.

6. A flat panel display unit, comprising:
   a first substrate including at least a substantially transparent textured, etched alumino-silicate glass having a thickness of about 0.5 millimeters, said textured, etched alumino-silicate glass reduces an amount of reflected specular light on a surface of the first substrate;
   an anti-reflective thin film coating applied to the first substrate;
   a second substrate including a touch screen device, the second substrate being laminated to the first substrate, the touch screen device detecting a location of a touch in a display area of said second substrate;
   a flat panel display including at least one of a third substrate, a fourth substrate, a liquid crystal layer embedded between third and fourth substrates, or a backlight assembly;
   an exterior oleophobic coating; and
   at least one printed circuit board.

7. The flat panel display unit of claim 6, wherein said anti-reflective thin film coating comprises:
   an anti-reflective coating stack.

8. The flat panel display unit of claim 6, wherein said second substrate including a touch screen device comprises:
   an outer screen of a flat panel display touchscreen.

9. The flat panel display unit of claim 6, further comprising:
   a hydrophobic coating.

10. The flat panel display unit of claim 6, further comprising:
   a conductive coating for reducing electro-magnetic interference.

* * * * *